P. CONNIN & J. McNALL.
COOKING UTENSIL.
APPLICATION FILED MAR. 28, 1913.

1,088,539. Patented Feb. 24, 1914.

Witnesses
C. James Cronin
R. F. Maryman

Inventors
Peter Connin &
John McNall,
By Victor J. Evans
Attorney

COLUMBIA PLANOGRAPH CO., WASHINGTON, D. C.

UNITED STATES PATENT OFFICE.

PETER CONNIN AND JOHN McNALL, OF JERSEY CITY, NEW JERSEY.

COOKING UTENSIL.

1,088,539. Specification of Letters Patent. Patented Feb. 24, 1914.

Application filed March 28, 1913. Serial No. 757,475.

*To all whom it may concern:*

Be it known that we, PETER CONNIN and JOHN McNALL, citizens of the United States, residing at Jersey City, in the county of Hudson and State of New Jersey, have invented new and useful Improvements in Cooking Utensils, of which the following is a specification.

The general object of the invention is to prevent the vapor generated in a cooking boiler in the operation of cooking foods and the like, from commingling with the atmosphere in the house in which the cooking takes place. And to this end the invention resides in combining with a cooking utensil certain hereinafter described apparatus adapted for forming a chamber for receiving the vapor escaping from the cooking boiler and a passageway for establishing communication between the chamber and the fire box of the stove, whereby to have the draft through such fire box, serve as a means for drawing the vapors from the chamber and into the fire box.

Other objects will appear and be better understood from that embodiment of our invention of which the following is a specification, reference being had to the accompanying drawings forming part hereof, in which:—

Figure 1:
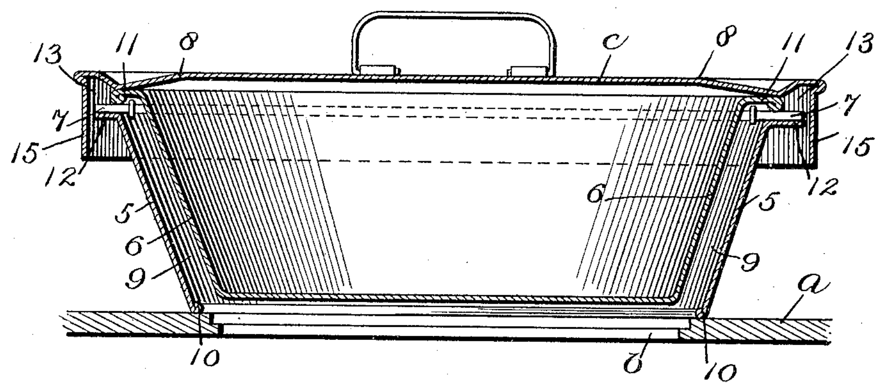
Figure 2:
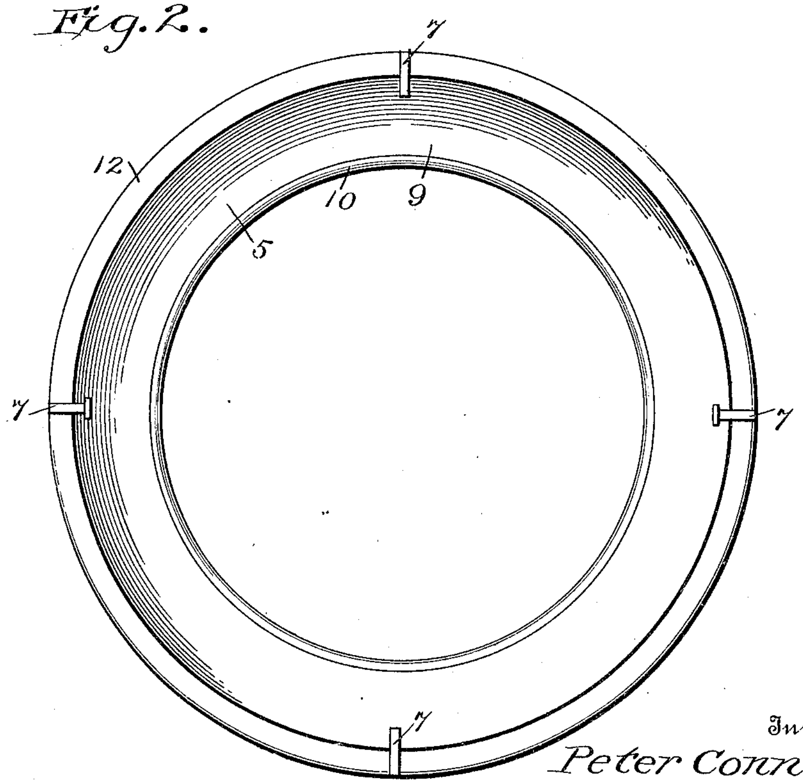

Figure 1 is a vertical cross section of the device in use. Fig. 2 is a detail plan of the thimble with the cooking utensil and the cover removed.

In the drawings *a* indicates a sufficient portion of the top of a cook stove to illustrate one application of our invention and *b* indicates one of the lid openings usually found in the top of a cook stove.

The apparatus employed for carrying out the principle of our invention, includes a thimble 5, a cooking boiler or receptacle such as a pan 6, spacing elements 7 interposed between the peripheral flanges of the pan and thimble and a cover 8 adapted for surrounding the upper portions of the thimble and receptacle 6.

The receptacle 6 may be of any preferred construction and formed of any material suitable for the purpose, as metal. The thimble 5 is by preference made to conform in contour to the receptacle 6 and preferably formed of metal. This thimble 5, however, differs from the receptacle 6 in point of size so as to provide a passage 9 when the receptacle is inserted into the thimble, and the thimble also differs from the receptacle in that it is bottomless and its lower end 10 is of a diameter to snugly fit within the opening *b* or as shown in Fig. 1, this diameter may be extended so as to admit of the thimble bearing on the upper face of the top and completely surround the opening *b*.

The receptacle is formed with the usual flange 11 and the upper end portion of the thimble is flanged as indicated at 12. By having the thimble and receptacle similarly flanged bearing surfaces are provided for the spacing elements 7 which operate to hold the flanges in spaced relation and since a series of these elements is employed as shown in Figs. 1 and 2, and arranged in spaced relation, it will be manifest that by their presence the space between the flanges 11 and 12 will act as a port in establishing communication between the passage 9 and the chamber 13 which is formed in the angle between the flange 15 and the body *c* of the cover 8. The cover 8 may, of course, be of any desired construction but is sufficiently large to surround the upper end of the thimble and the flange sufficiently deep to provide the chamber previously mentioned.

When in use and with the parts positioned as shown in Fig. 1, the vapors upon escaping between those portions of the cover and receptacle which bear one upon the other, will enter the chamber 13. Now inasmuch as the air pressure in the said chamber due to the action of the draft in the fire box of the stove, is less than the atmospheric pressure in the room, it will be manifest that the said vapors will commingle with the air in the chamber and move with the latter through the space between the flanges 11 and 12, into the passage 9 and finally into the fire box through the opening *b* from whence the commingled air and vapors will pass upwardly through the chimney.

What is claimed as new is:

In combination, a flanged cooking receptacle, a flanged bottomless thimble adapted to surround the lid opening of a stove, and a cover, the said thimble surrounding the cooking receptacle and coöperating with the said receptacle to provide a passage communicating with the lid opening of the stove, the said cover having a flange which surrounds the flanged portions of the thimble and cooking receptacle and forms a chamber, and a series of spacing elements interposed between the flanges of the cover and cooking receptacle.

In testimony whereof we affix our signatures in presence of two witnesses.

PETER CONNIN.
JOHN McNALL.

Witnesses:
JOHN A. DONEGA,
GEO. A. BYRNE.

Copies of this patent may be obtained for five cents each, by addressing the "Commissioner of Patents, Washington, D. C."